(12) United States Patent
Hildenbrand et al.

(10) Patent No.: US 7,387,084 B2
(45) Date of Patent: Jun. 17, 2008

(54) PET LITTER CONTAINMENT AND DISPOSAL MEANS INCORPORATING A REUSABLE, COLLAPSIBLE FRAME ASSEMBLY

(76) Inventors: Casey Hildenbrand, 29379 Kime Holderman Rd., Circleville, OH (US) 43113; Diane E. Hildenbrand, 29379 Kime Holderman Rd., Circleville, OH (US) 43113

(*) Notice: Subject to any disclaimer, the term of this patent is extended or adjusted under 35 U.S.C. 154(b) by 61 days.

(21) Appl. No.: 11/424,792

(22) Filed: Jun. 16, 2006

(65) Prior Publication Data

US 2007/0289545 A1 Dec. 20, 2007

(51) Int. Cl.
*A01K 29/00* (2006.01)
(52) U.S. Cl. ...................... 119/165; 119/170
(58) Field of Classification Search ............... 119/452, 119/461, 463, 474, 469, 470, 479, 491, 492, 119/498, 499, 28.5, 161, 168, 165, 170; D30/161
See application file for complete search history.

(56) References Cited

U.S. PATENT DOCUMENTS

| | | | |
|---|---|---|---|
| 4,299,365 A * | 11/1981 | Battle | 248/99 |
| 4,787,335 A * | 11/1988 | Carlyon | 119/170 |
| 4,813,374 A | 3/1989 | Sides | |
| 4,858,561 A * | 8/1989 | Springer | 119/165 |
| 4,951,605 A | 8/1990 | Brown | |
| 5,027,748 A | 7/1991 | Wolak | |
| 5,080,043 A | 1/1992 | Fields | |
| 5,094,188 A * | 3/1992 | Wolak | 119/168 |
| 5,134,974 A | 8/1992 | Houser | |
| 5,148,774 A | 9/1992 | Fields | |
| 5,396,864 A | 3/1995 | Mannschreck | |
| 5,636,593 A | 6/1997 | Vito | |
| 5,709,171 A | 1/1998 | Moore | |
| 5,918,567 A | 7/1999 | Roth | |
| 6,453,845 B1 | 9/2002 | Efrati et al. | |

* cited by examiner

*Primary Examiner*—Son T. Nguyen
(74) *Attorney, Agent, or Firm*—Harry E. Kitchen (57) ABSTRACT

Means for containing and handling pet litter, wherein a reusable, collapsible frame assembly is used cooperatively with a flexible trash bag to provide a structure for enclosing a litter container while in use, allowing the pet caregiver to dispose of the entire litter container without touching it. The reusable, collapsible frame assembly is designed to support the trash bag while in use, and to be partially or completely compressed for removal so that the litter, bag, and optionally the litter container can be disposed of together without requiring the animal caregiver to touch the contents.

3 Claims, 7 Drawing Sheets

PET LITTER CONTAINMENT AND DISPOSAL MEANS INCORPORATING A REUSABLE, COLLAPSIBLE FRAME ASSEMBLY

BACKGROUND OF THE INVENTION

1. Field of the Invention

This invention pertains to animal care products. More specifically, it pertains to means for containing litter for small animals while in use, and for enabling the sanitary disposal of litter following use. More specifically, it pertains to a combination of a collapsible frame, a disposable or permanent litter box, and a disposable trash bag to provide multiple advantages to the animal and its caregiver.

2. Description of Related Art

U.S. Pat. No. 5,918,567 issued to Roth discloses a flexible bag surrounding a cat litter containment structure, and includes a skeletal frame.

U.S. Pat. No. 5,636,593 to Vito shows a frame structure whose configuration is variable from flat to a rectangular polyhedron, as in the subject invention.

Frame structures are also shown in Fields U.S. Pat. No. 5,148,774, and Brown U.S. Pat. No. 4,951,605.

Wolak U.S. Pat. No. 5,027,748 shows enclosure by a flexible bag with an interior supporting structure made of rigid walls.

Improvements over the prior art reside in the collapsible and reusable features, simplicity of structure and use, compatibility with disposable trash bags of the conventional art, and many other features which will become evident with detailed disclosure that follows.

BRIEF SUMMARY OF THE INVENTION

Objects of the Invention

It is an object of this invention to provide a novel enclosure means for pet litter containment.

It is a further object of this invention to provide enclosure means for pet litter containment, with the advantage of preventing the dispersion of pet litter as it is used by small animals including cats.

It is a further object of this invention to provide enclosure means for pet litter containment, with the advantage of hiding the pet litter and its animal waste products from view.

It is a further object of this invention to provide enclosure means for pet litter containment, with the advantage of inhibiting the diffusion of odors throughout human living quarters.

It is a further object of this invention to provide enclosure means for pet litter containment, which can employ inexpensive, easily obtainable and disposable elements and supplies.

It is a further object of this invention to provide enclosure means for pet litter containment, which can easily be assembled and put into use by the animal's caregiver.

It is a further object of this invention to provide enclosure means for pet litter containment, which can easily be discarded by the animal's caregiver.

It is a further object of this invention to provide enclosure means for pet litter containment, which can be discarded by the animal's caregiver in a sanitary manner, and without coming into contact with the animal waste.

Other objects and advantages will become apparent upon detailed disruption of the invention and its use.

DETAILED DESCRIPTION OF THE INVENTION

Figure 1:
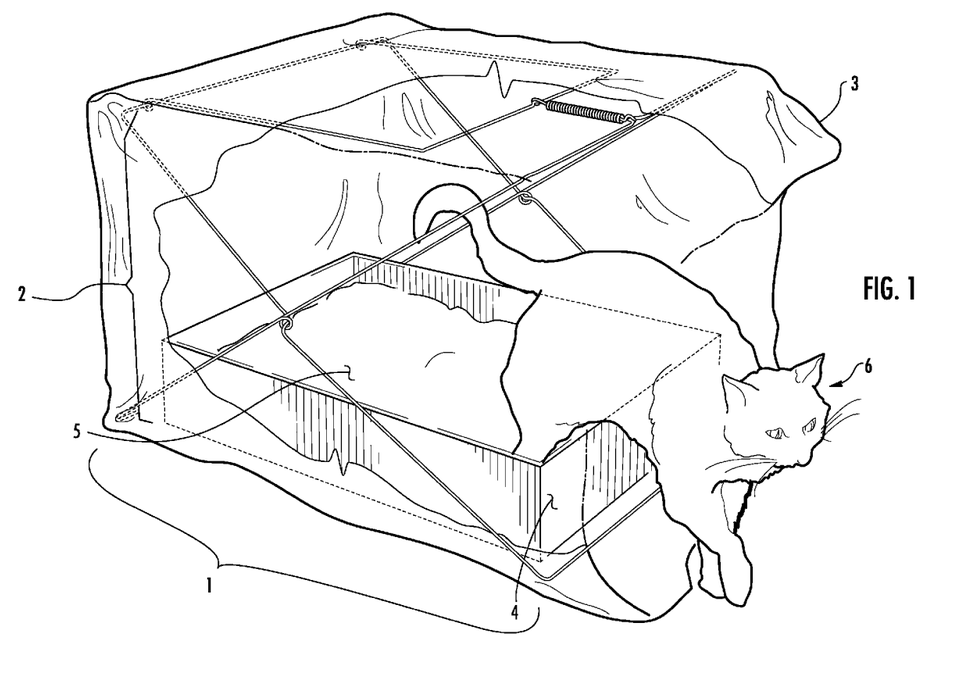
FIG. 1 is an X-ray and cutaway view of the preferred embodiment of the invention in use.

Referring first to FIG. 1, there is shown means for containing and discarding pet litter 1, including collapsible frame 2 which in its open configuration holds open a trash bag 3 of the conventional art, which in turn covers a litter box 4 of the conventional art. The article is shown in normal use, with the pet 6 exiting through the opening in the trash bag 3.

Figure 2:
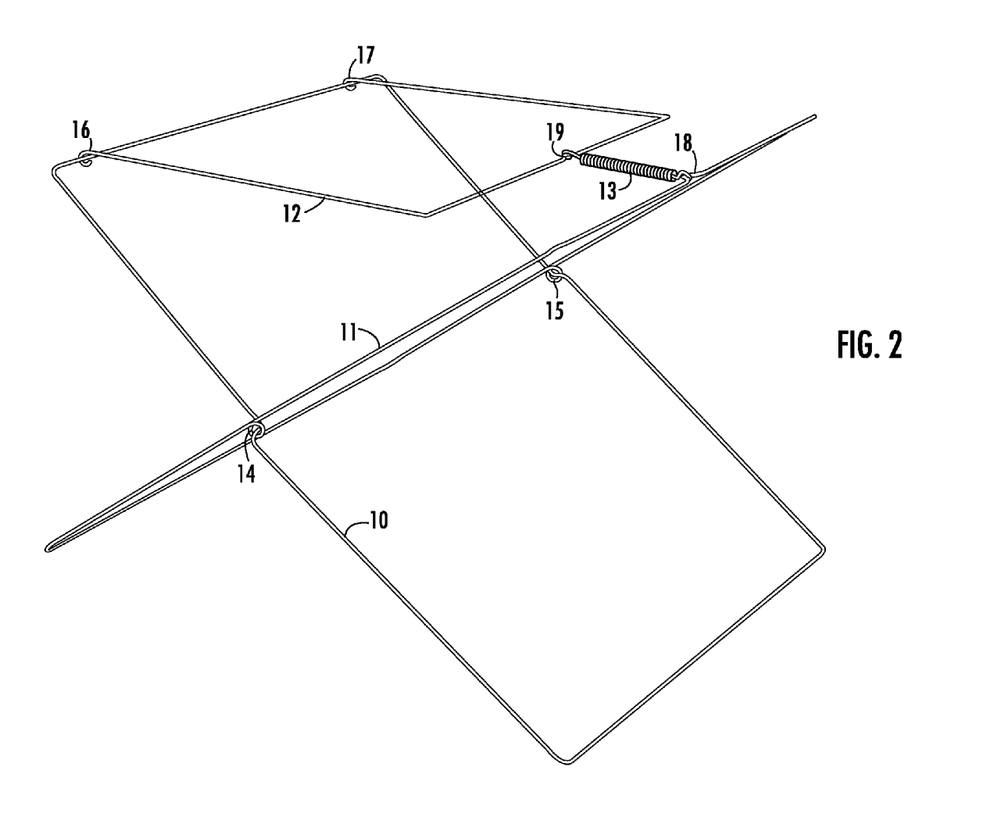
FIG. 2 shows the assembled collapsible frame of the preferred embodiment in its open configuration
Figure 3:
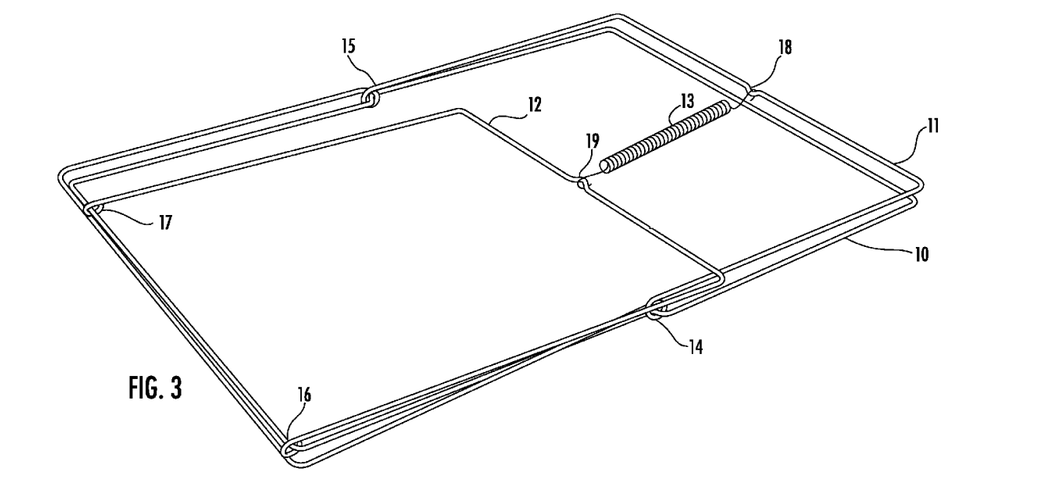
FIG. 3 shows the assembled collapsible frame of the preferred embodiment in its spring-loaded, compressed configuration, as when being inserted or removed from a trash bag.
Figure 4:
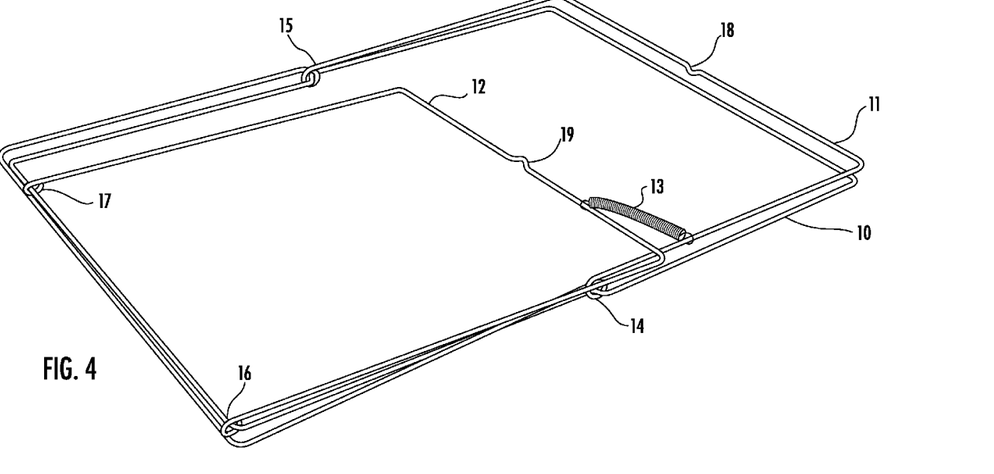
FIG. 4 shows the assembled collapsible frame of the preferred embodiment in its collapsed configuration, as when being shipped or stored.

FIGS. 2, 3 and 4 depict the collapsible frame 2 in its open, compressed, and closed configurations, respectively. In all three views there are rectangular frame members 10 and 11, which interlock with each other via cooperative hinge means 14 and 15, allowing them fully to pivot from the open configuration of FIG. 2 to the compressed and closed configurations of FIGS. 3 and 4.

Referring to the open configuration of FIG. 2, we see that the collapsible frame is held open by the action of an overhead frame member 12 and spring 13, which together provide a holding force between the top of rectangular member 10, and the top of rectangular frame member 11. The spring 13 is held in its proper position by catch means 18 and 19, which are integral parts of rectangular frame member 11 and overhead frame member 12.

Referring to the compressed configuration of FIG. 3, we see that the spring 13 becomes extended, thereby providing a restoring force so that when the caregiver releases downward pressure on the frame, it returns to its open position as in FIG. 2. Referring back to FIG. 1, we see that once compressed, the collapsible frame 2 may be removed from trash bag 3.

Comparing the two views of FIGS. 3 and 4, we see that by sliding the spring 13 away from its catches 18 and 19 and past either corner of rectangular frame member 11, its stress is relieved and the entire assembly is allowed to collapse to a thin configuration for storage or shipping.

Referring again to FIGS. 1, 2, 3 and 4, advantageous use of the invention is as follows:

When the collapsible frame 2 is held in its compressed configuration as in FIG. 3, the caregiver may insert it into a trash bag of the conventional art, so that the overhead frame member 12 is on top, and the spring is toward the open end of the trash bag. Once the collapsible frame 2 is inserted into the bag, the caregiver may then allow it to open by releasing force on the top and allowing the spring 13 to exert its restoring force and open frame 2 to the open configuration of FIGS. 1 and 2.

When the collapsible frame 2 is in its collapsed configuration as in FIG. 4, the caregiver may convert it into its open configuration by sliding the spring 13 until it engages the two catches 18 and 19, thereby remaining in place to hold the entire structure open.

With the collapsible frame 2 inside the bag 3 and in its open configuration as in FIGS. 1 and 2, the caregiver may insert a litter box 4 of any convenient size and filled to a desired volume with litter 5.

We have found that domestic cats become accustomed to the enclosed structure very quickly, and that no extraordinary training or encouragement is required. During use by the pet or pets, our invention serves to hide the unsightly view of pet waste, helps prevent the dispersal of litter and pet waste about its surroundings, and retards the diffusion of odorous, airborne constituents that usually accompany pet waste.

When it is time to discard the litter and pet waste, our invention exhibits another advantageous feature by allowing the caregiver to remove the waste without touching the materials or structures that have come in contact with it.

Referring to FIG. 1, the caregiver simply compresses the frame 2 allowing it to be removed from the bag. Then the bag 3 containing the litter box 4, and litter 5 with pet waste may be lifted up, closed, and discarded without touching anything contaminated by the pet waste.

In the preferred embodiment, we find that a 30-gallon trash bag ideally accommodates a collapsible frame that is approximately 14×14×18 ½ inches (HWD), and that a 33-gallon trash bag suitably accommodates the same collapsible frame.

Figure 5:
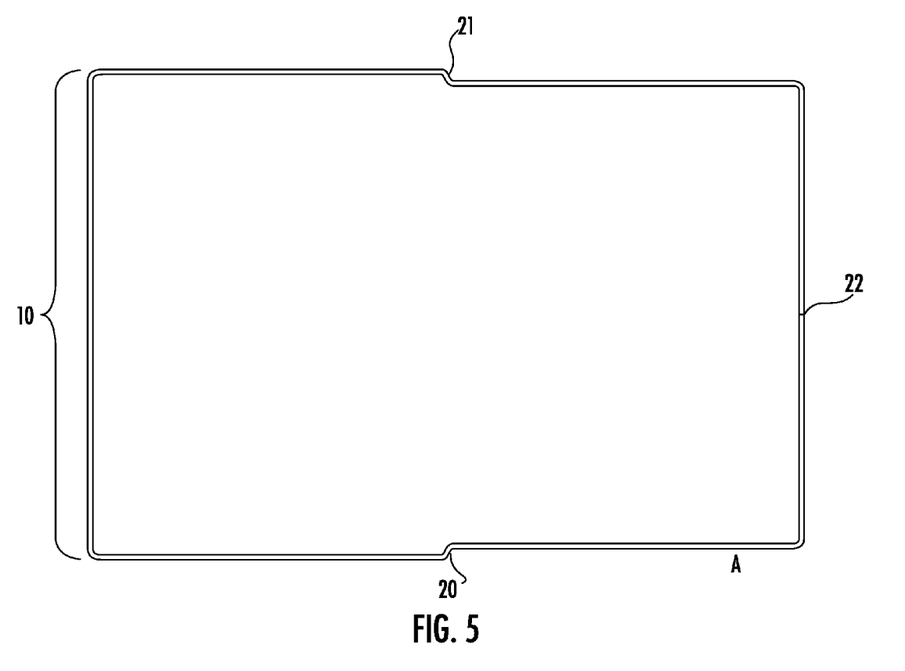
FIG. 5 illustrates a first rectangular member forming the collapsible frame.
Figure 6:
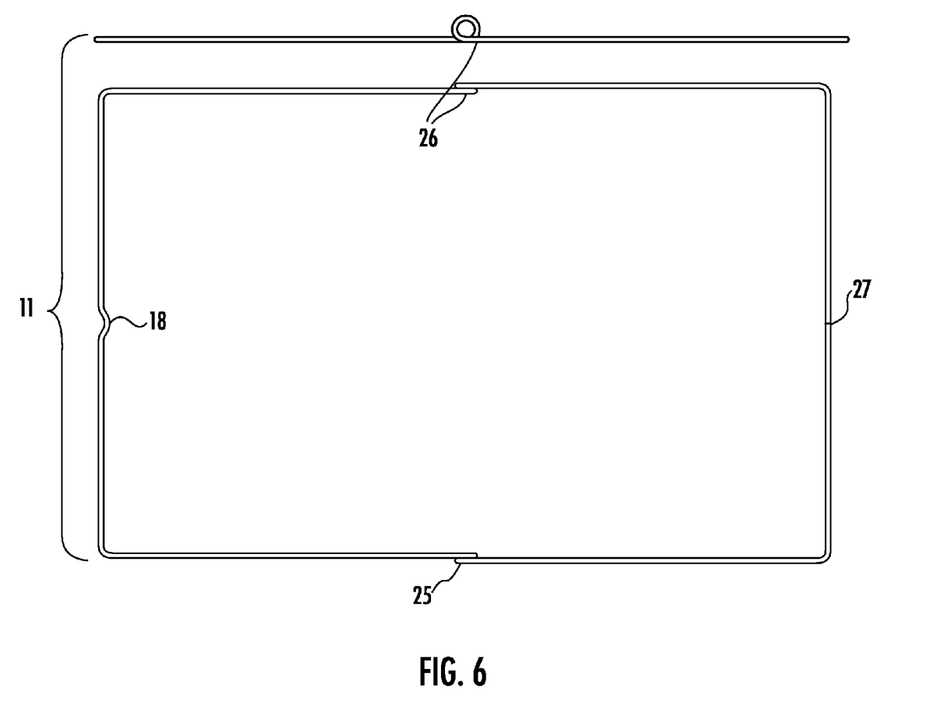
FIG. 6 illustrates a second rectangular member forming the collapsible frame.
Figure 7:
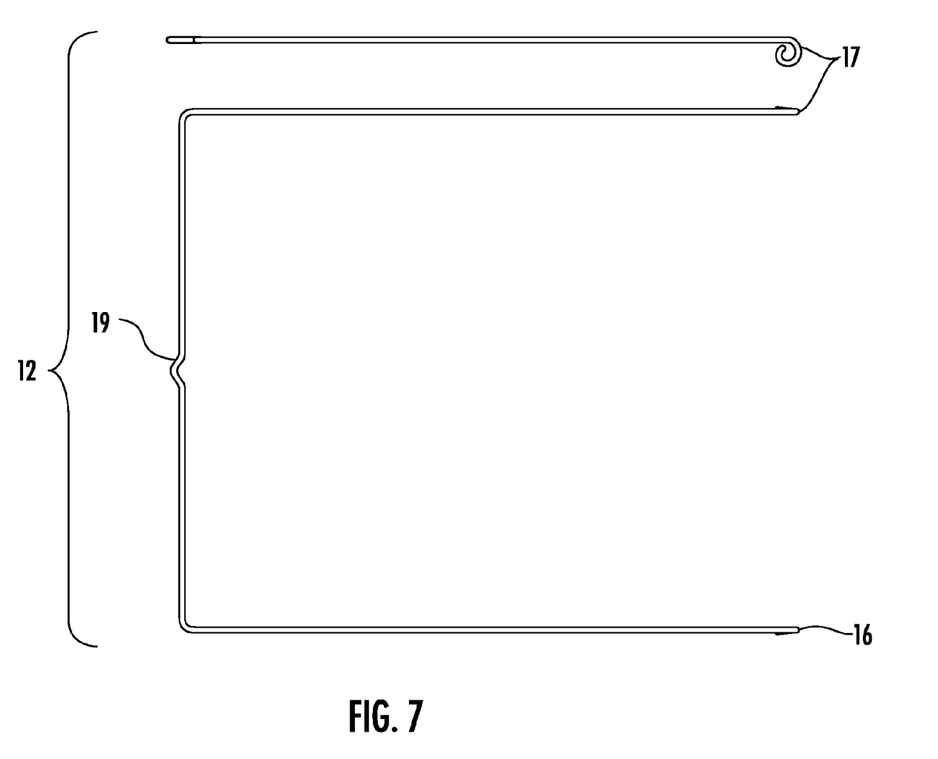
FIG. 7 illustrates an overhead member which holds the collapsible frame in its open configuration, and cooperates to restore the collapsible frame from its compressed to its open configuration.

In the preferred embodiment, detailed construction of the rectangular members is shown in FIGS. 5, 6 and 7. All three of the rectangular members may be constructed of steel wire of gage AWG 9, or of any convenient material which provides appropriate strength.

Referring first to FIG. 5, there is shown a first rectangular frame member 10, shaped to include near the midpoint of each long side inner hinge elements 20 and 21, to engage corresponding hinge members on the other rectangular member. The wire ends 22 near the midpoint of one short side may be joined after assembly by welding or other suitable means.

Referring to FIG. 6, there is shown a second rectangular frame member 11, shaped to include near the midpoint of each long side outer hinge elements 25 and 26, to engage the inner hinge elements 20 and 21. It further incorporates near the midpoint of one short side catch means 18, to engage spring means 13 of FIGS. 2 and 3. The wire ends 27 near the midpoint of the other short side may be joined after assembly by welding or other suitable means.

For the joints 22 and 27, the preferred embodiment has used gas tungsten arc welding, or GTAW, commonly referred to as tungsten inert gas (TIG) welding. The joints may be made in any suitable manner without departing from the definition and spirit of our invention.

Spring 13 is a conventional coil spring. Although a substantial range of spring stiffness is feasible, we have selected in the preferred embodiment a spring constant of approximately 198 N/m (1.13 lb/in) and a non-extended length of 8.26 cm (3.25 in).

Further, the preferred embodiment places the joints 22 and 27 near the midpoint of a short side of each rectangular frame member. This is judged to be preferable to reduce torsional stress on the joint, and the joints may be placed at other locations without departing from the definition and spirit of our invention.

Further, the preferred embodiment places the joints 22 and 27 on the short side which, when assembled, will be at the rear of the entire assembly. This is judged to be preferable for both cosmetics and stress reduction, and the joints may be placed at other locations without departing from the definition and spirit of our invention.

Referring to FIG. 7, there is shown overhead frame member 12, assuming a U-shape. It incorporates at its ends loops that form outer hinge elements 16 and 17 to engage the short side of rectangular frame member 10 of FIG. 5. It is further shaped to include near the midpoint of its short side catch means 19, to engage spring means 13 of FIGS. 2 and 3.

We claim the following:

1. Means for containment, enclosure and sanitary disposal of pet litter consisting of
   a pet litter container,
   a rectangular skeletal frame constructed of metal wire, large enough to enclose the pet litter container with a pet, and collapsible in a manner that allows it to be lifted away from the pet litter container, and
   a trash bag large enough to enclose the skeletal frame, with an open end to allow the skeletal frame to be removed without touching the contents of the litter container,
   wherein the skeletal frame consists of
      a first rectangular frame member with inner hinge means near the midpoint of the long sides,
      a second rectangular frame member
         with outer hinge means near the midpoints of the long sides, engaging said inner hinge means, and
         with catch means near the midpoint of one short side for engaging a spring, and
      a spring engaging said catch means on said second rectangular frame member, and
      a U-shaped overhead frame member with two long sides and one short side,
         with catch means near the midpoint of the short side for engaging a spring said spring, and
         with outer hinge means at the ends of the long sides for engaging a short side of said first rectangular frame member,
   so that the three frame members may be expanded into a rectangular shape for supporting a trash bag such that the entire assembly covers a pet litter box, and
   so that the three frame members may be partially compressed into a shorter rectangular shape for insertion into and removal from said trash bag.

2. In a means for containment, enclosure and sanitary disposal of pet litter, a reusable, collapsible frame for supporting a trash bag, consisting of
   a first rectangular frame member with inner hinge means near the midpoint of the long sides,
   a second rectangular frame member
      with outer hinge means near the midpoints of the long sides, engaging said inner hinge means, and
      with catch means near the midpoint of one short side for engaging a spring, and
   a spring engaging said catch on said second rectangular frame member, and a U-shaped overhead frame member with two long sides and one short side,
  with catch means near the midpoint of the short side for engaging a spring said spring, and
  with outer hinge means at the ends of the long sides for engaging a short side of said first rectangular frame member,
so that the three frame members may be expanded into a rectangular shape for supporting a trash bag such that the entire assembly covers a pet litter box, and
so that the three frame members may be partially compressed into shorter rectangular shape for insertion into and removal from said trash bag, and
so that the three frame members may be completely collapsed into a flat rectangular shape for insertion into and removal from said trash bag, or for shipping.

3. The reusable, collapsible frame of claim 2, constructed of metal wire.

* * * * *